US010572981B2

(12) United States Patent
Yamamura et al.

(10) Patent No.: US 10,572,981 B2
(45) Date of Patent: Feb. 25, 2020

(54) RADIATION IMAGE PROCESSING APPARATUS

(71) Applicant: Konica Minolta, Inc., Tokyo (JP)

(72) Inventors: Takuya Yamamura, Mitaka (JP); Tatsuya Takagi, Mitaka (JP)

(73) Assignee: KONICA MINOLTA, INC., Tokyo (JP)

( * ) Notice: Subject to any disclaimer, the term of this patent is extended or adjusted under 35 U.S.C. 154(b) by 57 days.

(21) Appl. No.: 15/934,385

(22) Filed: Mar. 23, 2018

(65) Prior Publication Data

US 2018/0286021 A1 Oct. 4, 2018

(30) Foreign Application Priority Data

Mar. 30, 2017 (JP) .................. 2017-066822

(51) Int. Cl.
*G06K 9/46* (2006.01)
*G06T 5/00* (2006.01)
*G06T 5/10* (2006.01)

(52) U.S. Cl.
CPC .............. *G06T 5/004* (2013.01); *G06T 5/003* (2013.01); *G06T 5/10* (2013.01); *G06T 2207/20016* (2013.01)

(58) Field of Classification Search
CPC .. H04N 5/23212; H04N 5/378; H04N 13/243; H04N 9/045; H04N 5/232

USPC ........ 382/191, 260, 162, 166, 248; 348/239, 348/222.1, 241, 273
See application file for complete search history.

(56) References Cited

U.S. PATENT DOCUMENTS 8,860,856 B2 * 10/2014 Wetzstein ................ G06T 5/50
348/222.1
9,402,592 B2 * 8/2016 Garcia ................ A61B 6/4283

FOREIGN PATENT DOCUMENTS

JP H1075395 A 3/1998
JP H10105701 A 4/1998

* cited by examiner

*Primary Examiner* — Charlotte M Baker
(74) *Attorney, Agent, or Firm* — Lucas & Mercanti, LLP

(57) ABSTRACT

An image processing apparatus includes the following. A hardware processor decomposes a signal value of input image data into band-limited signals having different frequency bands from each other. A storage stores pieces of preset data. Each of the pieces of preset data comprises tables to associate frequency with a response and to prescribe different response properties from each other. The hardware processor selects a piece of preset data from the pieces of preset data stored in the storage, converts the decomposed band-limited signals on a basis of tables in the selected piece of preset data, reconstructs the converted band-limited signals into enhanced image data, and generates a frequency-enhanced image through addition of the enhanced image data which is multiplied by a predetermined enhancement coefficient to the input image data.

10 Claims, 4 Drawing Sheets

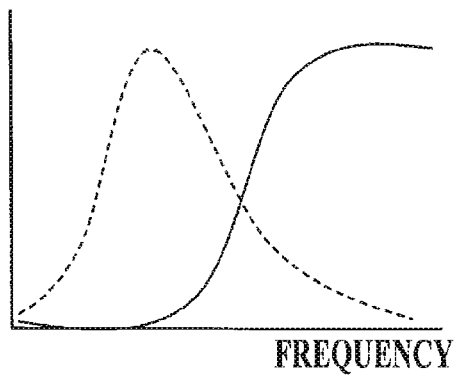
FIG.4A PRESET 1
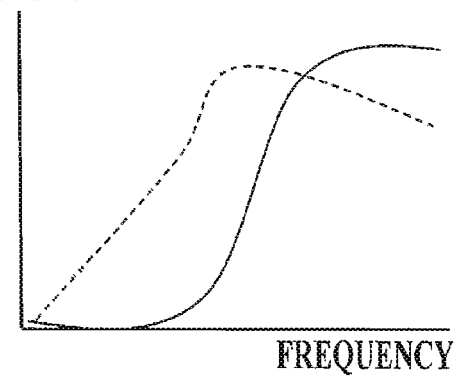
FIG.4B PRESET 2
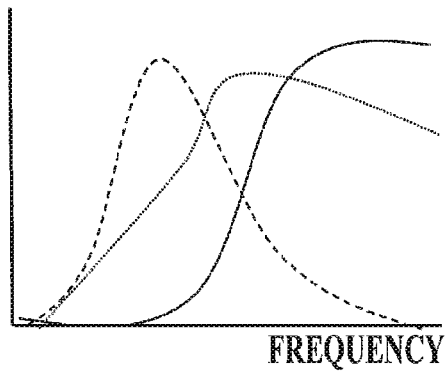
FIG.4C PRESET 3
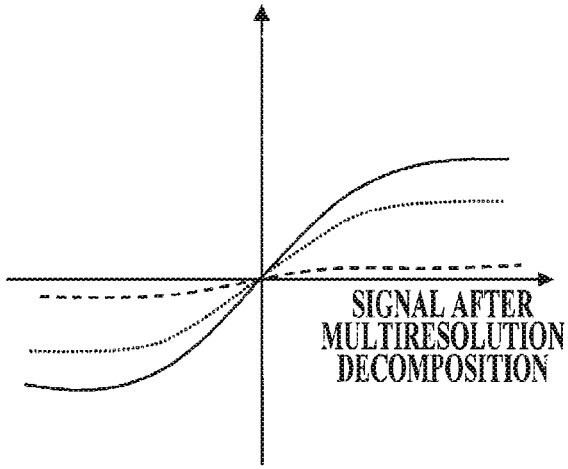
FIG.5A
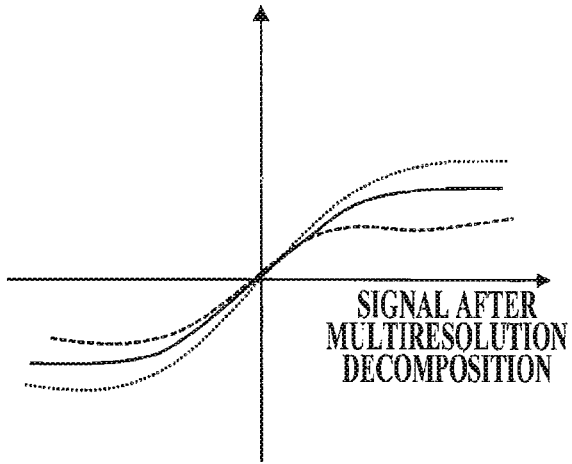
FIG.5B

RADIATION IMAGE PROCESSING APPARATUS

CROSS-REFERENCE TO RELATED APPLICATIONS

The entire disclosure of Japanese Patent Application No. 2017-066822 filed on Mar. 30, 2017 is incorporated herein by reference in its entirety.

BACKGROUND

1. Technological Field

The present invention relates to an image processing apparatus and a radiation image capturing system provided with the image processing apparatus.

2. Description of the Related Art

There have been proposed a variety of techniques which enhance a specific frequency component in a radiation image captured by a radiation image capturing apparatus, in order to obtain a radiation image which can be interpreted easily.

For example, there has been known a frequency-enhanced image in which a high frequency component is enhanced. Such an image can be obtained by a conversion process to reduce at least one of multiple band-limited image signals at least partly, integrating the converted band-limited image signal(s) to generate an integrated signal, multiplying the integrated signal by a predetermined enhancement coefficient, and adding the multiplied signal to the original image signal (see Japanese Patent Application Laid-Open Publication No. hei 10-075395). Otherwise, a radiation image may be subjected to a nonlinear conversion process using a conversion function which is defined so that smaller radiation dose results in stronger suppression (see Japanese Patent Application Laid-Open Publication No. hei 10-105701). According to the conversion function, each frequency band component of the radiation image is suppressed.

According to the technique described in Japanese Patent Application Laid-Open Publication No. hei 10-075395, generation of artifacts can be suppressed near edges in the frequency-enhanced image. According to the technique described in Japanese Patent Application Laid-Open Publication No. hei 10-105701, enhancement with less noise is possible by suppressing frequency enhancement at a low density portion.

However, the image processes according to Japanese Patent Application Laid-Open Publication Nos. hei 10-075395 and hei 10-105701 are not always suitable for the object or matching the user's preference.

SUMMARY

The present invention is conceived in view of the above problems, and an object of the present invention is to provide an image processing apparatus which enhances frequency according to the composition of the object or according to user's preference.

In order to achieve at least one of the abovementioned objects, according to an aspect of the present invention, there is provided an image processing apparatus including: a hardware processor which decomposes a signal value of input image data into band-limited signals having different frequency bands from each other; and a storage which stores pieces of preset data, each of the pieces of preset data comprises tables to associate frequency with a response and to prescribe different response properties from each other, wherein, the hardware processor is configured to, select a piece of preset data from the pieces of preset data stored in the storage, convert the decomposed band-limited signals on a basis of tables in the selected piece of preset data, reconstruct the converted band-limited signals into enhanced image data, and generate a frequency-enhanced image through addition of the enhanced image data which is multiplied by a predetermined enhancement coefficient to the input image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIGS. 4A to 4C are graphs illustrating preset data used in the image quality adjustment shown in FIG. 3;

FIGS. 5A and 5B are graphs illustrating conversion functions which results in the preset data in FIGS. 4A to 4C.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

[Configuration of Radiation Image Capturing System]

Figure 1:
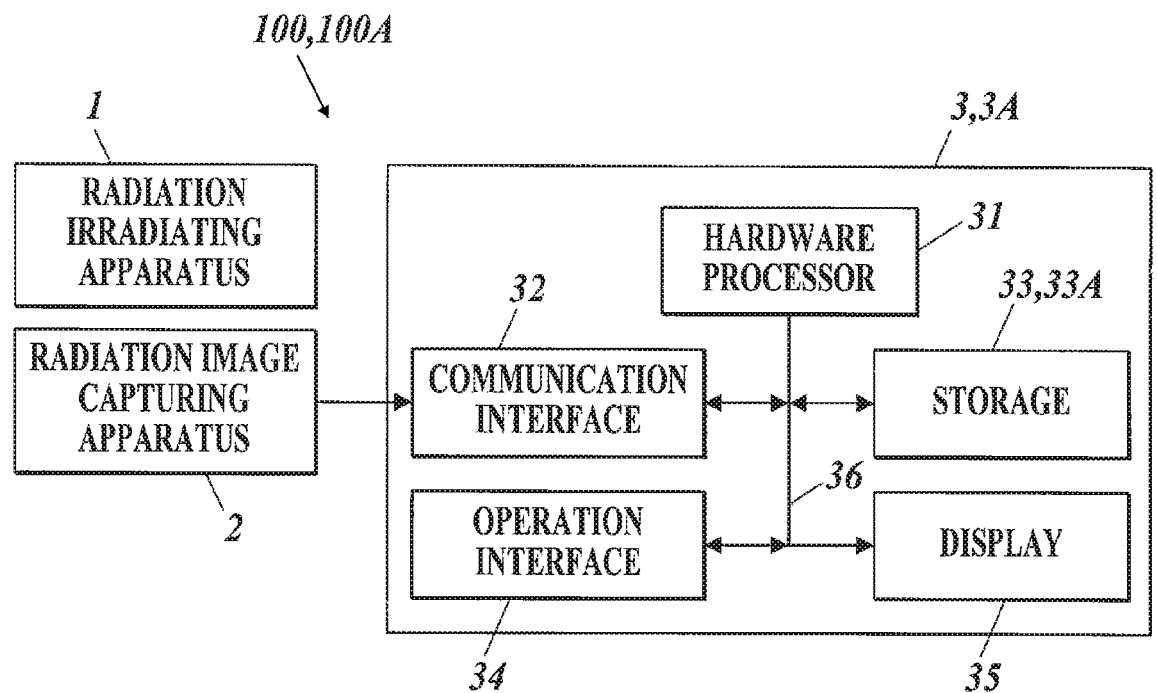
FIG. 1 is a block diagram showing an entire configuration of the image processing apparatus according to the first (second) embodiment of the present invention.

The first embodiment of the radiation image capturing system 100 according to the present invention will now be described. FIG. 1 is a block diagram showing a functional configuration of a radiation image capturing system 100 according to the first embodiment.

The radiation image capturing system 100 according to the first embodiment includes a radiation irradiator 1, a radiation image capturing apparatus 2, an image processing apparatus 3, and the like.

The radiation image capturing system 100 is connected to a console or a server (for example, a Picture Archiving and Communication System (PACS)) (not shown) as required.

The components of the radiation image capturing system 100 meet the Digital Image and Communications in Medicine (DICOM) standard and communicate with each other in accordance with the DICOM.

Although not illustrated, the radiation irradiator 1 includes a radiation source including a rotating anode that generates radiation and a filament that emits electron beams to the rotating anode, and a generator causing the radiation source to emit radiation in a volume corresponding to parameters, such as the tube voltage, the tube current, and the irradiation time (mAs value).

The radiation irradiating device 1 emits radiation to the radiation image capturing apparatus 22 in response to a user operation.

Although not illustrated, the radiation image capturing apparatus 2 includes a substrate provided with a two-dimensional array (matrix) of radiation detectors that accumulate charges according to the intensity of incident radiation, a reading circuit that reads the charges accumulated in the radiation detectors in the form of image data, and a communication device that communicates with external units and transmits the image data.

The radiation image capturing apparatus 2 receives radiation from the radiation irradiator 1, reads image data, and transmits the image data to an external unit via the communication device.

The radiation irradiator 1 may be integrated with the radiation image capturing apparatus 2.

The image processing apparatus 3 is directly or indirectly connected to the radiation image capturing apparatus 2, receives image data from the radiation image capturing apparatus 2, and performs predetermined image processes of the received image data.

The details of the image processing apparatus 3 will be described later.

[Configuration of Image Forming Apparatus]

The configuration of the image processing apparatus 3 of the radiation image capturing system 100 will now be described.

With reference to FIG. 1, the image processing apparatus 3 is a computer or a dedicated controller and includes a controller 31 (hardware processor), a communication interface 32, a storage 33, an operation interface 34, and a display 35. These components are connected with each other via a bus 36.

The controller 31 includes a central processing unit (CPU) and a random access storage (RAM). The CPU of the controller 31 comprehensively controls the operation of the components of the image processing apparatus 3 in accordance with the operation of the operation interface 34, for example, by reading system programs and various processing programs stored in the storage 33 and loading these programs to the RAM, carrying out various processes in accordance with the loaded programs, and controlling the contents appearing on the display 35.

The communication interface 32 includes a local area network (LAN) adapter, a modem, or a terminal adapter (TA). The communication interface 32 controls the transmission and reception of data among the modality connected to a communication network and other components such as a server.

The storage 33 includes a non-volatile semiconductor memory or a hard disk.

The storage 33 stores programs for the controller 31 to execute the various processes (for example, image quality adjustment detailed below), parameters required to execute the processes using the programs, and the results of the processes. The various programs are stored in the form of readable program codes.

The storage 33 stores original image data (still images and moving images) received by the communication interface, processed image data subjected to the various processes, and the like.

The storage 33 further stores multiple kinds of preset data described later.

The operation interface 34 includes a keyboard including cursor keys, numeric keys, and function keys and a pointing device, such as a mouse, operable by the user. The operating unit 34 sends instruction signals to the controller 31 in response to a key operation of the keyboard or a mouse operation.

The operation interface 34 may further include a touch panel on the display screen of the display 35. In such a case, instruction signals input via the touch panel are sent to the controller 31.

The display 35 includes a monitor, such as a liquid crystal display (LCD) or a cathode ray tube (CRT). In accordance with the instructions corresponding to display signals from the controller 31, the display 35 displays various images, instructions from the operation interface 34, and various data items.

[Operation of Image Processing Apparatus]

Figure 2:
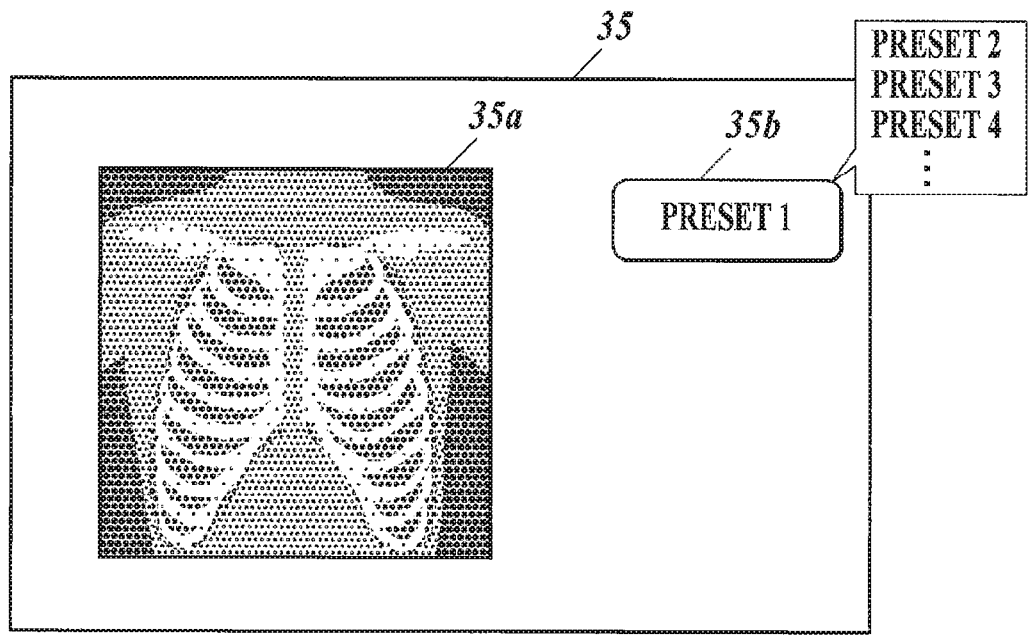
FIG. 2 is a diagram showing an example of a screen displayed in the display of the image processing apparatus in FIG. 1.
Figure 3:
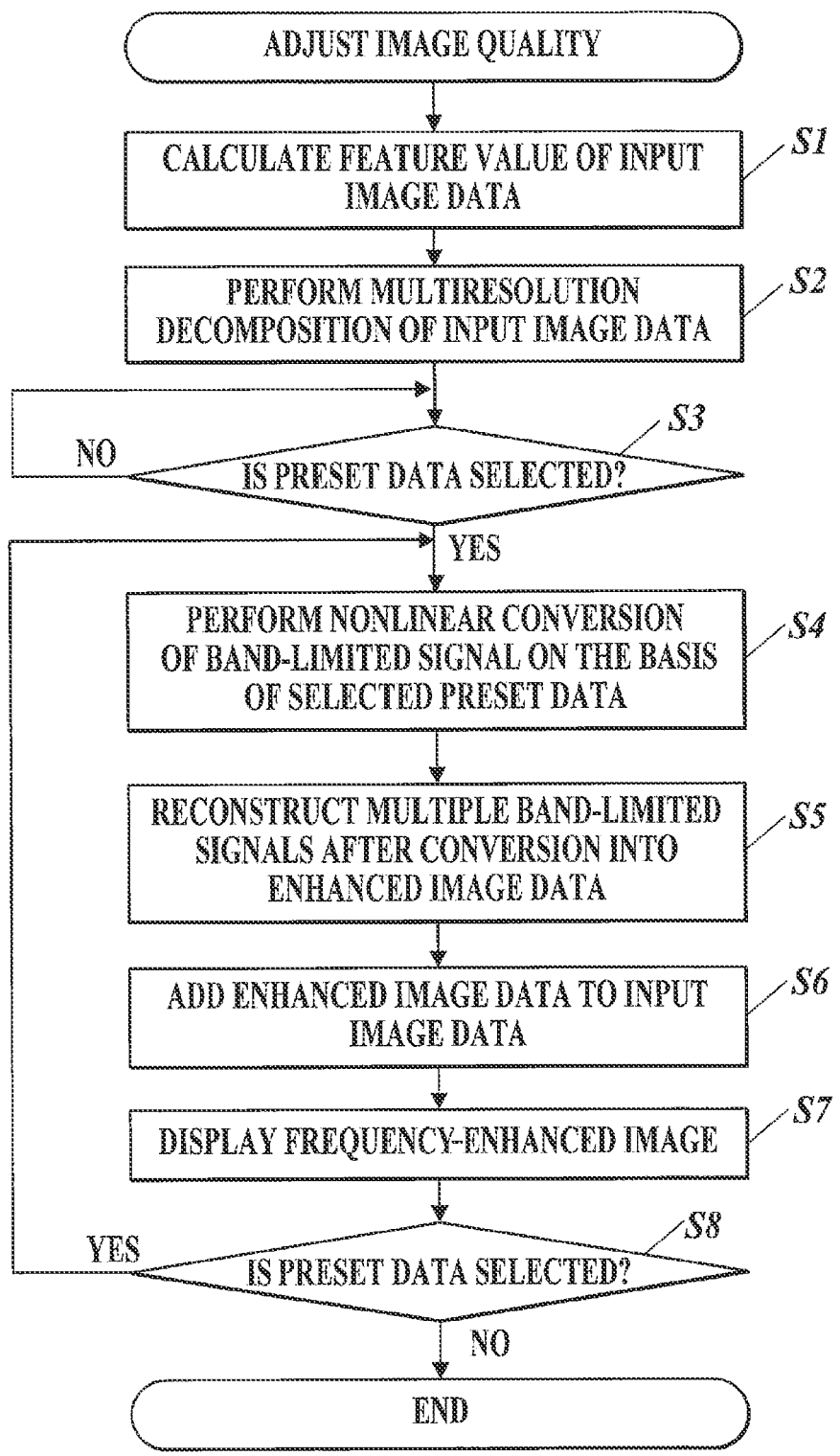
FIG. 3 is a flowchart showing image quality adjustment executed by the image processing apparatus.

The operation of the image processing apparatus 3 according to the first embodiment will now be described. FIG. 2 is a diagram showing an example of a screen displayed in the display 35. FIG. 3 is a flowchart showing image quality adjustment executed by the image processing apparatus 3.

In accordance with a predetermined operation via the operation interface 34 (for example, a power-on operation and a selection operation of image data to be processed), the controller 31 of the image processing apparatus 3 displays an operation screen in the display 35 including, for example, an image display region 35*a* and a preset data display region 35*b* (see FIG. 2) and executes image quality adjustment shown in FIG. 3.

The image quality adjustment may be automatically performed on the basis of image data of a radiation image received from the connected apparatus.

In the image quality adjustment, a feature value is calculated first (step S1). The feature value include, for example, a density (that is, a signal value) of each pixel in the radiation image, a value based on statistical properties calculated from the signal value (for example, a standard deviation, a variance, and a differential value), and a value obtained by combining two or more values (for example, combining a density and a variance).

In the description below, density is defined as the feature value.

The feature value may be calculated after the processing of step S2 detailed below.

After the process of step S1, a decomposition process is performed (step S2). Specifically, a signal value of each pixel of an image corresponding to the input image data is subjected to multiplex resolution conversion by Laplacian Pyramid or Discrete Wavelet Transformation to obtain multiple band-limited signals having different frequency bands (resolutions) from each other. The number of multiple band-limited signals increases according to the number of the decomposition processes. At least two band-limited signals are obtained in the first embodiment. The controller 31 functions as an image decomposition means according to the present invention.

After the process of step S2, it is determined whether or not a piece of preset data has been selected since the image quality adjustment was started. In other words, in the first embodiment, it is determined whether or not a user has performed an operation via the operation interface 34 to display a preset data number in the preset data display region 35*b* in the display 35 (step S3). The controller 31 selects a piece of preset data from the multiple pieces of preset data stored in the storage 33 in accordance with the operation via the operation interface 34. The controller 31 functions as a table selection means according to the present invention.

If it is determined in the process of step S3 that a piece of preset data has not been selected (step S3; No), the process of step S3 is repeated until it is determined that a piece of preset data has been selected.

Instead of the process of step S3 described above, the image quality adjustment may be started on the basis of selection of a piece of preset data. Otherwise, a predetermined piece of preset data may be automatically selected at the beginning of the image quality adjustment.

If it is determined in the process of step S3 that a piece of preset data has been selected (step S3; Yes), a conversion process is performed (step S4). Specifically, on the basis of the feature value obtained in step S1 and the selected preset data, a nonlinear conversion is performed for each of the multiple band-limited signals obtained in step S2. That is, the controller 31 functions as an image conversion means according to the present invention.

The nonlinear conversion in step S4 will now be described in detail. FIGS. 4A, 4B, and 4C are graphs illustrating the preset data. FIGS. 5A and 5B shows examples of conversion functions to determine the contents of the preset data.

As described above, the storage 33 stores multiple kinds of preset data. A piece of the preset data includes frequency balancing tables (hereinafter, tables) registered in advance. The tables respectively prescribe a correlation (a response property) between frequency and response. Different tables prescribe different response properties. By plotting the frequency prescribed in the table on the horizontal axis and plotting the response corresponding to the frequency on the vertical axis, curves in FIGS. 4A, 4B, and 4C are obtained, for example.

At least one piece of the preset data preferably includes multiple tables different from each other in combination which are used according to the feature values.

For example, Presets 1 and 2 shown in FIGS. 4A and 4B respectively include two tables in combination. One (indicated by a dashed line) is applied to pixels having a density (a signal value) less than a predetermined value A, and the other (indicated by a solid line) is applied to pixels having a density equal to or more than the predetermined value A.

The predetermined value A may be fixed or may be determined on the basis of a histogram representing density distribution.

As a result of the nonlinear conversion using Preset 1 shown in FIG. 4A, a low frequency component is mainly enhanced in low density pixels and a high frequency component is mainly enhanced in high density pixels.

As a result of the nonlinear conversion using Preset 2 shown in FIG. 4B, a middle frequency component is mainly enhanced in low density pixels and a high frequency component is mainly enhanced in high density pixels.

Each piece of preset data is determined, for example, on the basis of conversion functions represented by the graphs shown in FIGS. 5A and 5B. FIG. 5A is a graph representing conversion functions corresponding to a table for high density pixels in Preset 2. FIG. 5B is a graph representing conversion functions corresponding to a table for low density pixels in Preset 2. Specifically, according to the conversion functions for high density pixels, the curve for the low frequency component has a small inclination from the horizontal axis and the curve for the high frequency component has a large inclination from the horizontal axis (see FIG. 5A). As a result, the low frequency component is converted to a small response and the high frequency component is converted to a large response. Meanwhile, according to the conversion functions for low density pixels, because the curve for a high frequency component has a smaller inclination from the horizontal axis (see FIG. 5B) compared to the one according to the conversion functions for high density pixels (see FIG. 5A). As a result, a middle frequency component is converted to large response, and a high frequency component is converted to smaller response in low density pixels than in high density pixels.

The number of signals after multiresolution decomposition is not limited to three as in FIGS. 5A and 5B, but may be four or more or may be two. The shape of the graph representing the conversion function is not limited to those in FIGS. 5A and 5B.

If different tables are not used according to density as in Presets 1 and 2, that is, if the selected piece of the preset data include only one table (for example, the table indicated by a solid line in FIG. 4A), only a high frequency component is enhanced regardless of density. As a result, noises are excessively enhanced in low density pixels and low or middle frequency components are not sufficiently enhanced in high frequency pixels, so that the contrast of the image may be insufficient. However, by using different tables according to the feature value as described above, noises can be sufficiently reduced and an image having sufficient contrast can be obtained.

Preset data shown in FIGS. 4A and 4B are merely examples and other preset data can be also stored.

For example, as Preset 3 in FIG. 4C, a piece of preset data may include three tables (or four tables or more) in combination. One (indicated by a dashed line) is applied to pixels having a low density less than a predetermined value A, another (indicated by a dotted line) is applied to pixels having a middle density equal to or more than the predetermined value A and less than a predetermined value B, and the other (indicated by a solid line) is applied to pixels having a high density equal to or more than the predetermined value B.

Thus, pieces of preset data is stored, which are to be selected and include different tables in combination used according to the feature value. This makes it possible to provide images suitable for the composition of the object or matching the user's preference.

In the process of step S4 described above, the nonlinear conversion process is basically performed according to the tables registered in the selected preset data. However, the present invention is not limited thereto, and if at least one of the band-limited image signals of a pixel is equal to or more than a predetermined threshold, the band-limited image signals in the pixel may be converted to small responses. For example, if one of the band-limited image signals is equal to or more than a predetermined threshold, the conversion function indicated by the dashed line in FIG. 5A may be used for the conversion process.

This prevents generation of artifacts near the edges of the image after the nonlinear conversion.

The flowchart of FIG. 3 will now be resumed. After the process of step S4, a reconstruction process is performed (step S5). Specifically, after decomposition into multiple frequency bands and the subsequent nonlinear conversion (balance modification) in step S4, the prepared multiple band-limited signals are subjected to inverse conversion to reconstruct a piece of enhanced image data. Thus, the controller 31 functions as an image reconstruction means according to the present invention.

After the process of step S5, the enhanced image data is multiplied by a predetermined enhancement coefficient and is added to the input image data to generate a frequency-enhanced image (step S6). Thus, the controller 31 functions as an addition means according to the present invention.

After the process of step S6, the frequency-enhanced image is displayed in the display 35 (step S7). Because the display 35 of the first embodiment includes the image display region 35a and the preset data display region 35b, the information (i.e., the number) of the selected preset data is displayed with the frequency-enhanced image.

After the process of step S7, it is determined whether or not preset data has been reselected since the process of step S4 is started (step S8). If it is determined in the process of step S8 that preset data has not been reselected (step S8; No), the image quality adjustment is ended.

If it is determined in the process of step S8 that preset data has been reselected (step S8; Yes), the controller 31 returns the process to Step S4 and performs the nonlinear conversion on the basis of the feature value and the reselected preset data.

According to the image processing apparatus 3 of the first embodiment which operates as described above, for example, if Preset 1 is selected first, only low and middle frequency components are enhanced in low density pixels. That is, in the enhanced image which is based on Preset 1 and displayed first in the image display region 35a of the display 35, while noises are not enhanced strongly, a high frequency component is also not enhanced. Therefore, the user may feel that the frequency-enhanced image is not sufficiently sharp. In that case, however, the user can select Preset 2 so that a new frequency-enhanced image based on Preset 2 is displayed in the image display region 35a. Because a high frequency component is enhanced to some extent even in low density pixels according to Preset 2, a frequency-enhanced image with less noise is displayed while securing sharpness (which is likely to match the user's preference).

In the image processing apparatus 3 according to the first embodiment, as described above, the information (i.e. the number) of the selected preset data is displayed with the frequency-enhanced image. The user can confirm the processed frequency-enhanced image immediately after reselection of the preset data thereby, so that the working efficiency can be improved.

Second Embodiment

Figure 6:
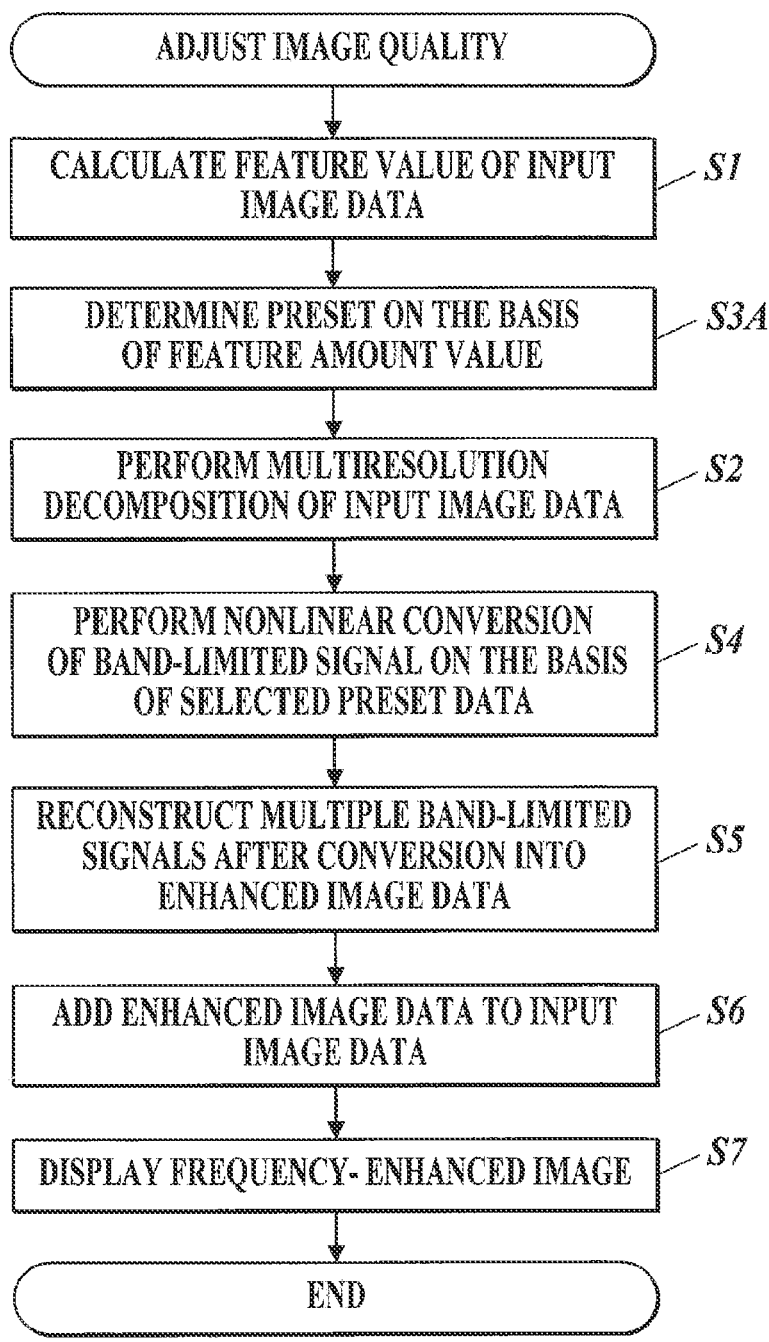
FIG. 6 is a flowchart showing image quality adjustment executed by the image processing apparatus according to the second embodiment of the present invention.

Next, an image processing apparatus according to the second embodiment of the present invention will be described. FIG. 6 is a flowchart showing an image quality adjustment process executed by the image processing apparatus 3A according to the second embodiment.

According to the radiation image capturing system 100 of the first embodiment, the user selects the preset data to be used. Meanwhile, according to the radiation image capturing system 100A of the second embodiment, the image processing apparatus 3A automatically selects the preset data to be used.

Accordingly, the image processing apparatus 3A according to the second embodiment is different from the image processing apparatus 3 according to the first embodiment in the point of detailed image quality adjustment processes, that is, in the contents stored in the storage 33A. The configuration of the second embodiment is the same as that of the first embodiment, except for the contents stored in the storage 33A.

In the image quality adjustment according to the second embodiment, a selection process is performed after the process of step S1 (step S3A). Specifically, a piece of preset data is selected from the multiple pieces of the preset data on the basis of the calculated feature value. After the process of step S3A, the controller 31 proceeds to the process of step S2, and further to the process of step S4.

The process of step S3A may be performed between the process of step S2 and the process of step S4.

After the process of step S7, the process of step S8 according to the first embodiment (the process of reselection by the user) may be performed.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
a hardware processor which decomposes a signal value of input image data into band-limited signals having different frequency bands from each other; and
a storage which stores pieces of preset data, each of the pieces of preset data comprises tables to associate frequency with a response and to prescribe different response properties from each other, and at least one of the pieces of preset data includes multiple tables in combination, which are different from each other and used according to a feature value calculated from the input image data,
wherein, the hardware processor is configured to,
select a piece of preset data from the pieces of preset data stored in the storage,
convert the decomposed band-limited signals on a basis of tables in the selected piece of preset data,
reconstruct the converted band-limited signals into enhanced image data, and
generate a frequency-enhanced image through addition of the enhanced image data which is multiplied by a predetermined enhancement coefficient to the input image data.

2. The image processing apparatus according to claim 1, further comprising an operation interface operated by a user, wherein, the hardware processor selects the piece of preset data on a basis of an operation to the operating interface.

3. The image processing apparatus according to claim 1, wherein, the hardware processor automatically selects the piece of preset data on a basis of feature value calculated from the input image data.

4. The image processing apparatus according to claim 3, wherein, the feature value comprises two or more of a density of a pixel, a standard deviation of the signal value, a variance of the signal value, and a differential value of the signal value.

5. The image processing apparatus according to claim 3, wherein, the feature value comprises a density of a pixel, a standard deviation of the signal value, a variance of the signal value, or a differential value of the signal value.

6. The image processing apparatus according to claim 1, wherein the response properties of each of the pieces of preset data enhance a predetermined band of frequency.

7. The image processing apparatus according to claim 1, further comprising
a display which displays the frequency-enhanced image generated by the hardware processor, wherein, the display displays information of the selected piece of preset data with the frequency-enhanced image.

8. A radiation image capturing system comprising:
a radiation irradiator;
a radiation image capturing apparatus which receives radiation from the radiation irradiator and generates image data of a radiation image; and
the image processing apparatus according to claim 1 which is connected to the radiation image capturing apparatus directly or indirectly.

9. The image processing apparatus according to claim 1, wherein the response properties of one of the pieces of preset data enhance a low frequency component in low density pixels and the response properties of another of the pieces of preset data enhance a high frequency component in high density pixels.

10. The image processing apparatus according to claim 9, wherein the response properties of a further of the pieces of preset data enhance a middle frequency component in low density pixels.

\* \* \* \* \*